(12) United States Patent
Ito et al.

(10) Patent No.: US 12,269,175 B2
(45) Date of Patent: Apr. 8, 2025

(54) CURVED SURFACE FOLLOWING CONTROL METHOD FOR ROBOT

(71) Applicant: Kawasaki Jukogyo Kabushiki Kaisha, Kobe (JP)

(72) Inventors: Masanori Ito, Kobe (JP); Hiroki Suemoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 307 days.

(21) Appl. No.: 17/785,402

(22) PCT Filed: Dec. 15, 2020

(86) PCT No.: PCT/JP2020/046780
§ 371 (c)(1),
(2) Date: Jun. 15, 2022

(87) PCT Pub. No.: WO2021/125175
PCT Pub. Date: Jun. 24, 2021

(65) Prior Publication Data
US 2023/0028732 A1    Jan. 26, 2023

(30) Foreign Application Priority Data
Dec. 16, 2019  (JP) .................................. 2019-226602

(51) Int. Cl.
*B25J 9/16*  (2006.01)
(52) U.S. Cl.
CPC .......... *B25J 9/1694* (2013.01); *B25J 9/1633* (2013.01)
(58) Field of Classification Search
None
See application file for complete search history.

(56) References Cited

U.S. PATENT DOCUMENTS

| | | | | |
|---|---|---|---|---|
| 5,129,044 A | * | 7/1992 | Kashiwagi | G05B 19/4163 700/251 |
| 5,590,244 A | * | 12/1996 | Nakata | B25J 9/1684 318/578 |

(Continued)

FOREIGN PATENT DOCUMENTS

JP    7-210230 A    8/1995

OTHER PUBLICATIONS

Chen Fan et al., "Contact force control and vibration suppression in robotic polishing with a smart end effector", Robotics and Computer-Integrated Manufacturing, vol. 57, Jun. 2019, pp. 391-403, total 20 pages.

*Primary Examiner* — Thomas E Worden
*Assistant Examiner* — Atticus A Cameron
(74) *Attorney, Agent, or Firm* — XSENSUS LLP (57) ABSTRACT

A surface following control method for a robot is used for controlling the robot including a hand part, an arm part, and a controller. In this surface following control method for the robot, processes including a normal direction identification process and a work tool posture control process are performed. In the normal direction identification process, a normal direction of a virtual shape at a virtual position where the work tool attached to the hand part contacts the virtual shape which is a shape represented by the formula is identified. In the work tool control process, the work tool attached to the hand part is brought into contact with the target workpiece at a corresponding position which is a position corresponding to the virtual position on the surface of the target workpiece, in a posture along the normal direction identified in the normal direction identification process.

3 Claims, 7 Drawing Sheets

(56) References Cited

U.S. PATENT DOCUMENTS

2014/0114477 A1* 4/2014 Sato .................... G05B 19/423
                                                    700/250
2018/0283019 A1* 10/2018 Telleria .................. E04F 21/16

* cited by examiner

FIG. 7

CURVED SURFACE FOLLOWING CONTROL METHOD FOR ROBOT

CROSS-REFERENCE TO RELATED APPLICATIONS

This application is based on PCT filing PCT/JP2020/046780, filed on Dec. 15, 2020, and claims the priority of Japanese Patent Application No. 2019-226602 filed on Dec. 16, 2019, in Japan Patent Office, each of which is incorporated as a part of this application by reference in the entirety.

TECHNICAL FIELD

This invention relates to control of a robot to follow a curved surface.

BACKGROUND ART

Conventionally, control methods are known for making a robot, which performs a predetermined work on the surface of a target workpiece having a three-dimensional free-form surface with a work tool attached to its tip end, follow the curved surface of the target workpiece. PTL 1 discloses a pipe surface following control method of this type.

In the pipe surface following control method of PTL 1, a tip end of the force-controlled robot is moved while contacting a surface of a pipe as target workpiece, and shape information and position information is obtained by measuring the shape of the cross-section of the pipe from the movement trajectory of the tip end so that a model of the pipe created. The relative position errors between the pipe and the force-controlled robot are corrected based on the created pipe model.

PRIOR-ART DOCUMENTS

Patent Documents

PTL 1: Japanese Patent Application Laid-Open No. 7-210230 (1995)

SUMMARY OF THE INVENTION

Problems to be Solved by the Invention

However, the configuration of the above-mentioned PTL 1 requires acquiring the shape information of the target workpiece in advance by contacting the surface of the target workpiece and measuring it while scanning. Therefore, the advance preparation, such as acquiring the shape information of the target workpiece, is complicated. In addition, when a soft object such as a balloon is used as the target workpiece, there is room for improvement in that the balloon may be damaged by the scanning its surface by contact for acquiring the shape information.

The present invention is made in view of the circumstances described above, and an object of the present invention is to provide a curved surface following control method for a robot that can suitably follow a curved surface even if the target workpiece is soft.

Means for Solving the Problems

The problem to be solved is as described above, and the means to solve this problem and their effects are described below.

A first aspect of the present invention provides a curved surface following control method for a robot below. This curved surface following control method for a robot is used for controlling the robot including a hand part, an arm part, and a controller. A work tool is attached to the hand part of the robot. The arm part is connected to the hand part. The controller controls operation of the hand part and the arm part. In this curved surface following control method for the robot, processes including a normal direction identification process and a work tool posture control process are performed. In the normal direction identification process, based on a formula for approximating a shape of a target workpiece including a curved surface, a normal direction of a virtual shape which is a shape represented by the formula at a virtual position where the work tool attached to the hand part contacts the virtual shape is identified. In the work tool control process, the work tool attached to the hand part is brought into contact with the target workpiece at a corresponding position which is a position corresponding to the virtual position on a surface of the target workpiece, in a posture along the normal direction identified in the normal direction identification process.

This allows the robot to work while suitably following the curved surface of the target workpiece, and also simplifies the advance preparation process. Also, even if the target workpiece is a soft object, the robot can be made to follow the surface of the workpiece well.

Effects of the Invention

According to the invention, the advance preparation can be simplified, and the curved surface of the target workpiece can be suitably followed even if the target workpiece is soft.

EMBODIMENT FOR CARRYING OUT THE INVENTION

Figure 1:
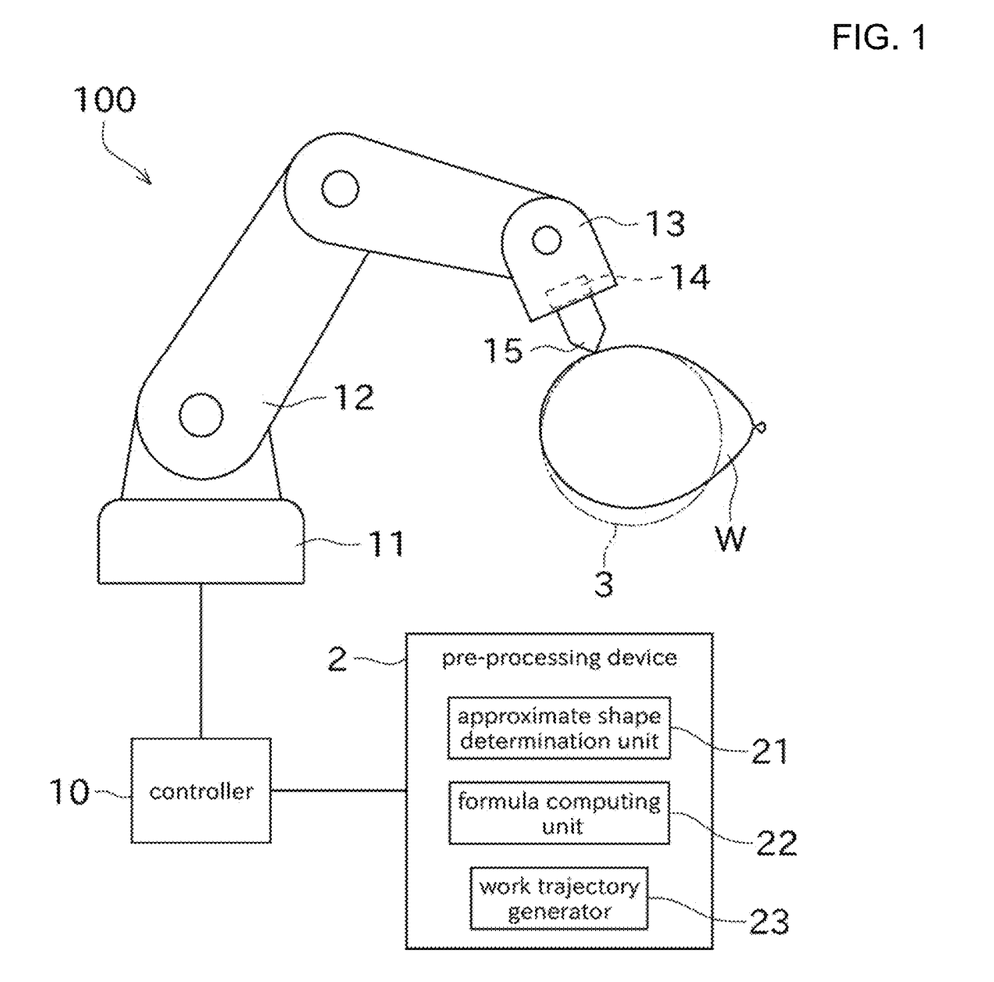
FIG. 1 is a side view of a robot to which the curved surface following control method for a robot according to one embodiment of the present invention is applied, following a balloon surface.

Next, embodiments of the present invention will be described with reference to the drawings. FIG. 1 is a side view showing a robot 100 to which the curved surface following control method for a robot of one embodiment of the invention is applied following the surface of a balloon W.

The robot 100 shown in FIG. 1 is configured, for example, as a vertical type articulated robot. The robot 100 can perform assembling, processing, painting, cleaning, and other works on a target workpiece. The robot 100 includes a support stand 11, an articulated arm (arm part) 12, an end effector (hand part) 13, and a controller 10.

The support stand 11 is used to fix the robot 100. Electric motors (not shown) to move each joint are located in the articulated arm. By moving the joints of the articulated arm 12 by these electric motors, the robot 100 can move the end effector 13 (work tool 15), for example, in three-dimensional space. An encoder that detects the rotation angle of the electric motor for driving the articulated arm 12 or the end effector 13 is provided for each of the joints.

The controller 10, which will be described later, can compute the movement trajectory and the like of the end effector 13 based on the rotation angle of the electric motors detected by the encoders. The controller 10 also stores output of the encoders (i.e., the rotation angle of each electric motor) when the robot 100 is in a posture. The posture can be reproduced by controlling the rotation of each electric motor by the stored rotation angle.

The end effector 13 is attached to the tip end of the articulated arm 12. The work tool 15 is detachably attached to the end effector 13 according to the work to be performed. Operation of the end effector 13 is controlled according to operation commands from the controller 10. The end effector 13 can move its position and posture within the three-dimensional space by driving the articulated arm 12. When the end effector 13 acts by direct contact with the target workpiece, the end effector 13 corresponds to a work tool.

A force sensor 14 is attached to the end effector 13. The force sensor 14 can detect force applied to the work tool 15 attached to the end effector 13.

The force sensor 14 can be configured to detect a moment instead of or in addition to the force. If the force sensor 14 can detect the pressing force to the target workpiece, it can be provided at a portion between the end effector 13 and the articulated arm 12, a portion of the work tool 15, or the like.

The controller 10 is used to control the posture, the movement, and the like of the articulated arm 12 and the end effector 13. The controller 10 is configured as a known computer and includes a processor, a storage unit, and a communication unit. The processor is a microcontroller, a CPU, an MPU, a PLC, a DSP, an ASIC, an FPGA or the like. The storage unit is a ROM, a RAM, an HDD or the like. The communication unit can communicate with external devices. The storage unit stores programs executed by the processor, various setting threshold values input from external devices via the communication unit, various data related to the curved surface following, and the like.

The controller 10 acquires external force acting on the work tool 15 based on a detection value of the force sensor 14. The controller 10 controls the electric motor (not shown) that drives the articulated arm 12 so that the external force is a certain value (is equal to a predetermined threshold value or in a predetermined threshold value range). Therefore, the work tool 15 is moved along a predetermined work trajectory while being pressed to the surface of the target workpiece. That is, the controller 10 makes the work tool 15 move along the surface shape of the target workpiece while controlling the pressing force of the work tool 15 against the surface of the target workpiece.

Next, the curved surface following control method for the robot of this embodiment will be described in detail, using an example case of drawing an arbitrary illustration on the surface (in detail, a top surface) of a balloon W as the target workpiece. In this example, the work tool 15 attached to the end effector 13 is a drawing pen 15a shown in FIG. 5.

Figure 2:
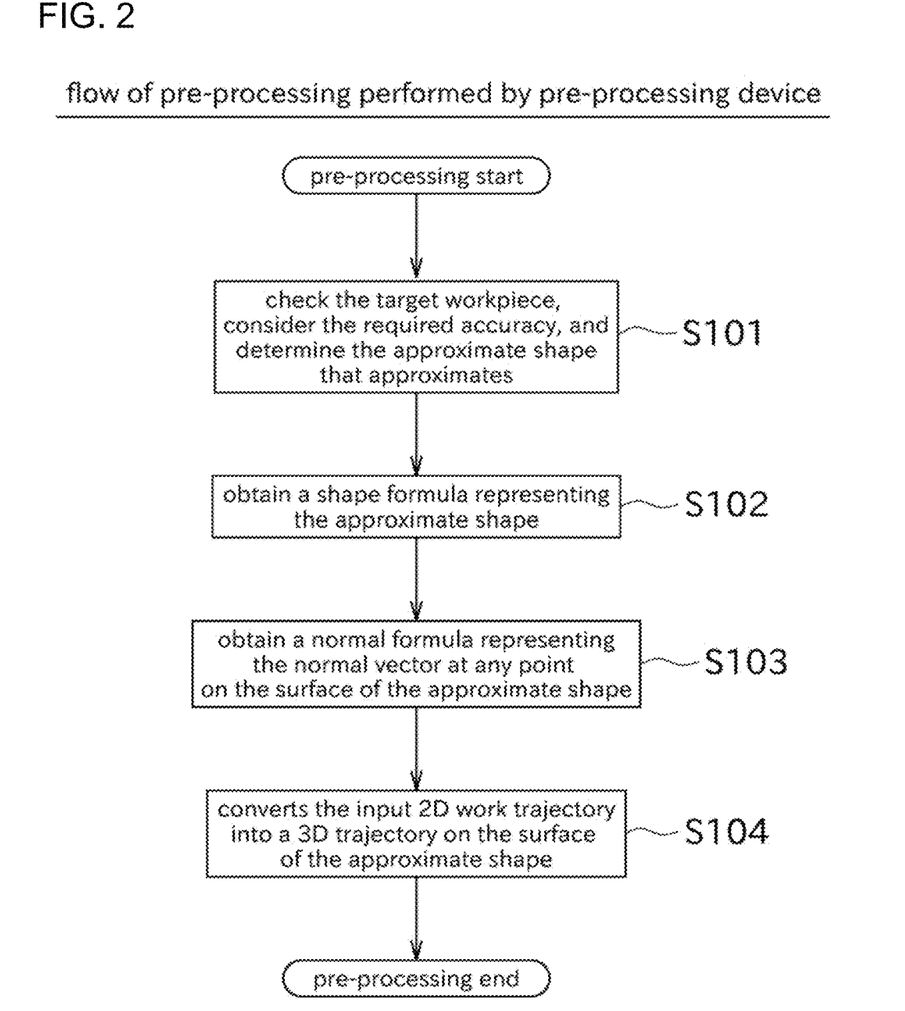
FIG. 2 is a diagram showing a flow of advance preparation performed by a pre-processing device.

As shown in FIG. 2, in this curved surface following control method for the robot of this embodiment, a pre-processing, such as determining an approximate shape for the shape of the target workpiece to be followed (the outer shape of the balloon W) is performed using a pre-processing device 2 (FIG. 1). Then, in this curved surface following control method for the robot, at the time of work (drawing), the controller 10 of the robot 100 controls the movement of the pen 15a while computing data related to the posture and movement of the end effector 13 (and thus the pen 15a) based on the approximate shape obtained in the pre-processing.

As shown in FIG. 1, the pre-processing device 2 includes an approximate shape determination unit 21, a formula computing unit 22, and a work trajectory generator 23. The pre-processing device 2 is provided separately from the controller 10 of the robot 100, for example.

The preprocessing device 2 is configured as a known computer and includes a processor, a storage unit, and a communication unit. The processor is a microcontroller, a CPU, an MPU, a PLC, a DSP, an ASIC, an FPGA or the like. The storage unit is a ROM, a RAM, an HDD or the like. The communication unit can communicate with external devices. The storage unit stores programs and the like, to be executed by the processor. The hardware and software cooperate with each other so that the pre-processing device 2 can function as the approximate shape determination unit 21, the formula computing unit 22, and the work trajectory generator 23.

The approximate shape determination unit 21 performs the first preparation step S101 of the advance preparation shown in FIG. 2. In the first preparation step S101, the approximate shape determination unit 21 analyzes the shape information of the balloon W and determines an approximate shape (virtual shape) that approximates the shape of the balloon W. Since the shape of the real balloon W is three-dimensional, the approximate shape is also three-dimensional. The three-dimensional shape information of the balloon W can be obtained, for example, by acquiring images using a plurality of cameras installed around the location where the balloon W is set, and analyzing a plurality of images. Instead of a plurality of cameras, the shape information of the balloon W may be obtained from three-dimensional point cloud data obtained by a three-dimensional laser scanner or the like.

The approximate shape can be determined, for example, so that errors between the position of the surface of the approximate shape and the position of the surface of the real balloon W are within a predetermined threshold value. The threshold value of the errors is determined by considering the accuracy required for the work. The approximate shape is selected from a plurality of predetermined geometric three-dimensional shapes (for example, sphere, ellipsoid, cylinder, cone, prism, and the like). In this embodiment, the approximate shape that approximates the balloon W is determined to be, for example, a sphere 3 shown in FIG. 1, etc. The approximate shape can be determined automatically, for example, by a trained model constructed in advance by machine learning. If the size, shape, and position of the balloon W are (approximately) fixed in advance, the analysis of the shape information can be omitted and the approximate shape set in advance by the operator, etc. can be used as it is.

The formula computing unit 22 performs the second preparation step S102, and the third preparation step S103 of the advance preparation shown in FIG. 2. In the second preparation step S102, the formula computing unit 22 obtains the shape formula, which is a formula representing the approximate shape determined by the approximate shape determination unit 21. The correspondence between the type of the approximate shape and the shape formula is stored in advance in the pre-processing device 2. When the approximate shape is a sphere 3, the obtained shape formula is, for example, the following formula (1).

$$\frac{(x-X_c)^2}{R^2} + \frac{(y-Y_c)^2}{R^2} + \frac{(z-Z_c)^2}{R^2} = 1 \quad (1)$$

Here, R is the radius of the sphere 3. ($X_C$, $Y_C$, $Z_C$) is the center of the sphere 3. (x, y, z) are the position coordinates representing a certain point on the surface of the sphere 3.

Then, in the third preparation step S103, the formula computing unit 22 obtains a normal formula, which is a formula representing a normal vector at an arbitrary position on the surface of the approximate shape determined in step S101. The correspondence between the type of the approximate shape and the normal formula is stored in advance in the pre-processing device 2, in the same way as the correspondence between the type of the approximate shape and the shape formula. When the approximate shape is a sphere 3, the obtained normal formula is, for example, the following formula (2). The normal vector obtained by the formula (2) is a vector from each position on the surface of the sphere 3 to the center of the sphere 3 ($X_C$, $Y_C$, $Z_C$).

$$-\frac{1}{\sqrt{(x-X_c)^2 + (y-Y_c)^2 + (z-Z_c)^2}} \begin{bmatrix} x-X_c \\ y-Y_c \\ z-Z_c \end{bmatrix} \quad (2)$$

The formula computing unit 22 transmits parameters representing the normal formula obtained as described above, for example, to the controller 10 of the robot 100 via the communication unit. In this case, the controller 10 uses the formula (2) to calculate the normal vector for each position of the planned work (planned drawing) on the surface of the sphere 3 (and thus the balloon W).

The first preparation step S101, the second preparation step S102 and the third preparation step S103 described above correspond to a normal direction identification process.

The work trajectory generator 23 performs the fourth preparation step S104 of the advance preparation shown in FIG. 2. In the fourth preparation step, the work trajectory generator 23 converts the two-dimensional work trajectory 5 input from an external device (or input by the operator) into a three-dimensional work trajectory 6 along the surface of the sphere as the approximate shape. In the example described here, the work trajectory (the two-dimensional work trajectory 5 or the three-dimensional work trajectory 6) is the trajectory of lines that constitute the illustration to be drawn. The three-dimensional work trajectory 6 can be said as, assuming that the shape of the real balloon W is equal to the approximate shape, a trajectory composed of each of the virtual contact points (virtual positions), which are the points where the pen 15*a* contacts the balloon W (in other words, the sphere 3).

The two-dimensional work trajectory 5 is represented in vector graphics format. The two-dimensional work trajectory 5 may be created, for example, by an operator using drawing software, or it may be created automatically by image processing of image data captured by an appropriate camera. The two-dimensional work trajectory 5 can be expressed, for example, as data containing combinations each of which includes coordinates indicating the position of a point in the XY two-dimensional coordinate system and information indicating whether to draw (stroke) or not, arranged according to the movement order of the pen 15*a*. Considering the finish of drawing on a shape with a curved surface, the distance between one point and the next point is defined to be sufficiently short.

Figure 3:
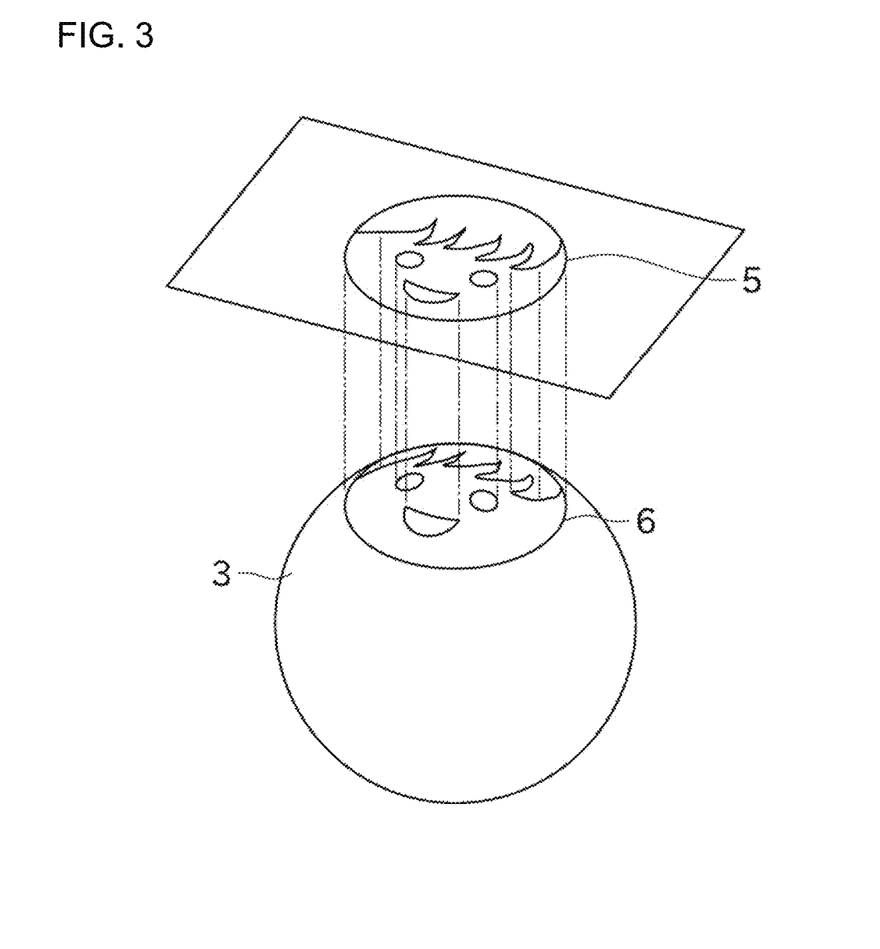
FIG. 3 is a diagram showing a projection of a two-dimension work trajectory onto the surface of a sphere.

The work trajectory generator 23 projects each of the points included in the input two-dimensional work trajectory 5 onto the surface of the sphere 3 as shown in FIG. 3 and obtains the position coordinates of each of the resulting projected points. As a result, the three-dimensional work trajectory 6 is generated. By this transformation, the three-dimensional work trajectory 6 is, for example, data containing combinations each of which includes coordinates indicating the position of a point in the three-dimensional coordinate system and information indicating whether or not to draw at that point, arranged according to the movement order of the pen 15*a*. However, the method of generating the three-dimensional work trajectory 6 (or data of the position coordinates and other data related to the three-dimensional work trajectory 6) is not limited to the above. Each point coordinate in the three-dimensional work trajectory 6 can be considered to be a virtual contact point which is a point of contact of the pen 15*a* with the surface of the virtual sphere 3 obtained by the approximation.

Hereafter, any virtual contact point is called a first virtual contact point, and the next virtual contact point after the first virtual contact point is called a second virtual contact point. Since each virtual contact point of the three-dimensional work trajectory 6 corresponds to each point of the two-dimensional work trajectory 5, the distance between the first, virtual contact point and the second virtual contact point is sufficiently short. Therefore, the vector from the first virtual contact point to the second virtual contact point substantially is, in the plane perpendicular to the normal direction at the first virtual contact point (in other words, in the plane tangent to the surface of the sphere 3 at the first virtual contact point). Thus, the direction from the virtual contact point to the next virtual contact point is always tangential to the sphere 3 as the approximate shape.

The direction of travel of the real pen 15*a* is determined based on the above vector, which will be described in detail below, so the vector is sometimes referred to as the pen travel direction vector (work tool travel direction vector) in the following. The pen travel direction vector corresponds to the difference between two virtual contact points whose order of passage is adjacent. Therefore, the three-dimensional work trajectory 6 usually contains the data of a large number of virtual contact points, and this data series can be considered as a group of a large number of pen travel direction vectors.

The work trajectory generator 23 transmits the obtained three-dimensional work trajectory 6 to the controller 10 of the robot 100 (or the formula computing unit 22) the communication unit.

After the advance preparation has been completed as described above, an actual drawing work begins. An illustration consists of many drawings (strokes) as usual, and for the sake of simplicity of explanation, the following description will focus on the process from the start of a single line drawing to its end.

When starting to draw on the top surface of the balloon W, the robot 100 moves the pen 15*a* so that the tip of the pen 15*a* is positioned far enough upward from the first virtual contact point (drawing start point) and at a position corresponding to the virtual contact point in the vertical direction. The robot 100 also adjusts the posture of the pen 15*a* so that it is aligned with the normal direction at the virtual contact point.

Then, the robot 100 moves the pen 15a downward while maintaining its posture and monitoring the detection value of the force sensor 14. As the pen 15a is moved downward, the pen 15a eventually comes into contact with the real balloon W, and the resulting force is detected by the force sensor 14. When the detection value of the force sensor 14 reaches a predetermined value during the process of movement, the downward movement of the pen 15a is stopped. The position of the tip of the pen 15a when the movement stops (which can be thought of as the position of the pen 15a in reality) can be below or above the virtual contact point.

The robot 100 then moves the pen 15a. The direction of this movement is a direction from the current virtual contact point to the next virtual contact point. This direction can be the tangential direction according to the three-dimensional work trajectory 6, as described above. In the process of this movement, the robot 100 adjusts the posture of the pen 15a to match the normal direction at the new virtual contact point. Furthermore, in this process, the vertical position of the pen 15a (i.e., the strength of contact between the tip of the pen 15a and the balloon W) is adjusted according to the detection value of the force sensor 14.

When the pen 15a reaches the last virtual contact point, the robot 100 moves the pen 15a upward, thus causing the pen 15a to move away from the real balloon W. As a result, a single line is drawn on the surface of the balloon W by the pen 15a. In this way, the robot 100 performs the drawing work while making the pen 15a follow the outer surface of the real balloon W while absorbing the shape error of the sphere 3 and the real balloon W with respect to the virtual contact points.

Figure 4:
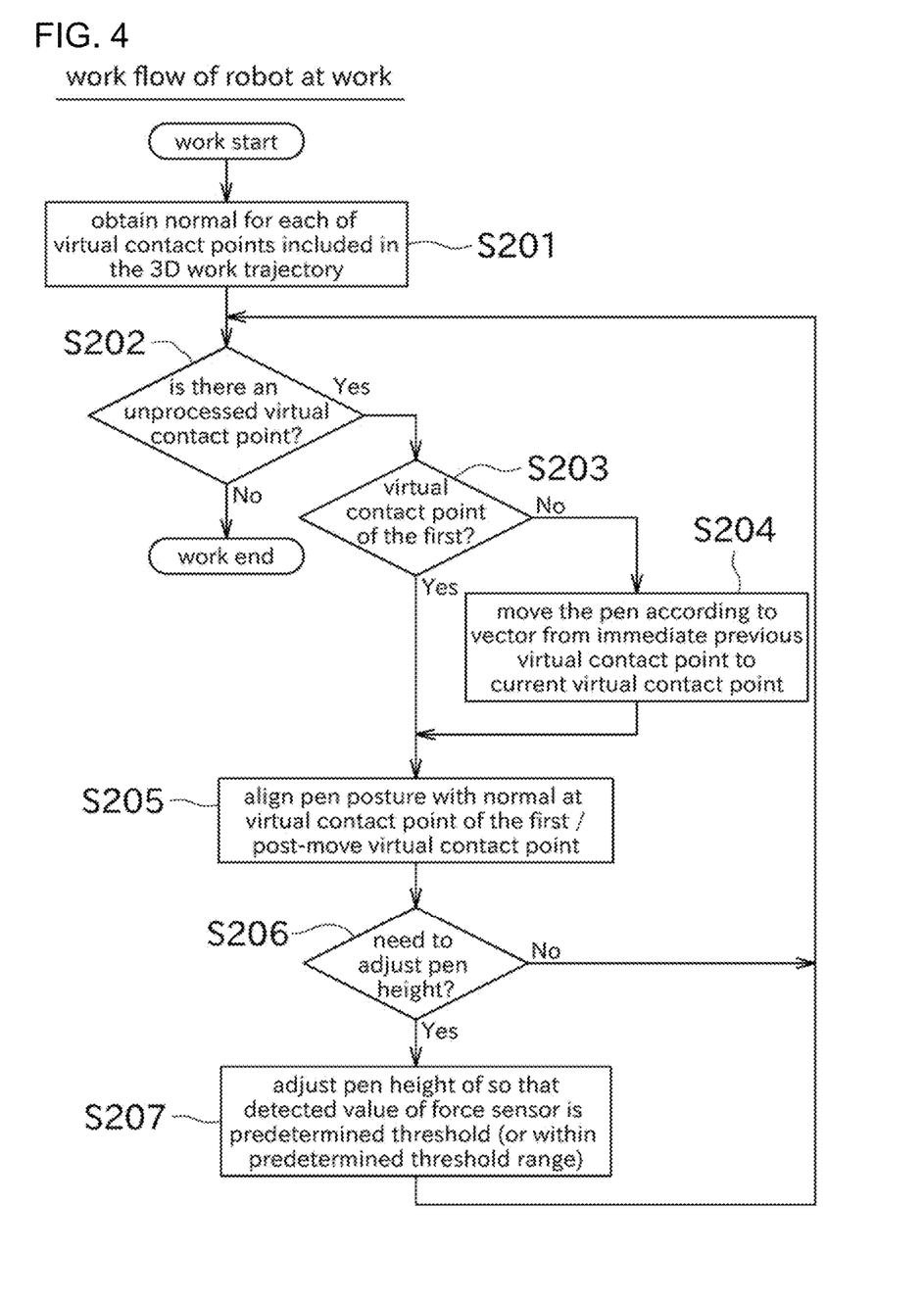
FIG. 4 is a flowchart showing an example of a work flow performed by a robot at a work.

FIG. 4 shows a flowchart of the process for achieving the above operation. This process will be described below. However, the flowchart shown in FIG. 4 is an example and the order or content of the processes can be changed.

When the drawing work starts, the controller 10 of the robot 100 first computes the normal vector at the virtual contact point using the above formula (2) for each of the virtual contact points included in to three-dimensional work trajectory 6, for performing the drawing work (step S201).

Then, the controller 10 determines whether there are any virtual contact points for which processing has not been completed (i.e., whether the drawing work has been completed or not) (Step S202). This determination is for repeating processes described below for all virtual contact points. Therefore, step S203 and subsequent processes described below are repeated until the processes for all virtual contact points (i.e., drawing work) are completed.

If the controller determines in step S202 that the drawing work is not yet complete, the controller 10 determines whether or not the virtual contact point to be processed in this loop cycle is the virtual contact point of the first (step S203).

In the determination in step S203, if the virtual contact point to be processed in this loop cycle is the virtual contact point of the first, the controller 10 adjusts the posture of the pen 15a so that it is in line with the normal vector at that virtual contact point (step S205), and then moves the pen 15a closer to the balloon W (step S206, step S207). The controller 10 stops the movement of the pen 15a at the position where the force applied to the pen 15a becomes the predetermined threshold value (or within the predetermined threshold value range), based on the detection value of the force sensor 14. That is, the controller 10 brings the pen 15a into contact with the balloon W with an appropriate pressing force in a posture that matches the normal vector at the virtual contact point of the first (step S206 and step S207).

As mentioned above, since the sphere 3 is an approximate shape of the balloon W, the actual contact point (corresponding position) which is the actual contact point between the pen 15a and the balloon W, does not coincide with the virtual contact point in most cases. The process then returns to step S202, and the next virtual contact point is processed.

In the determination in step S203, if the virtual contact point to be processed in this loop cycle is not the virtual contact point of the first, the pen 15a is moved from the immediately previous virtual contact point to the current virtual contact point (step S204). Since the distance between the two virtual contact points is sufficiently short, the distance the pen 15a moves is short. The direction of movement of the pen 15a is along a plane (tangent plane) that includes the immediately previous virtual contact point and is perpendicular to the normal vector at that virtual contact point.

Figure 6:
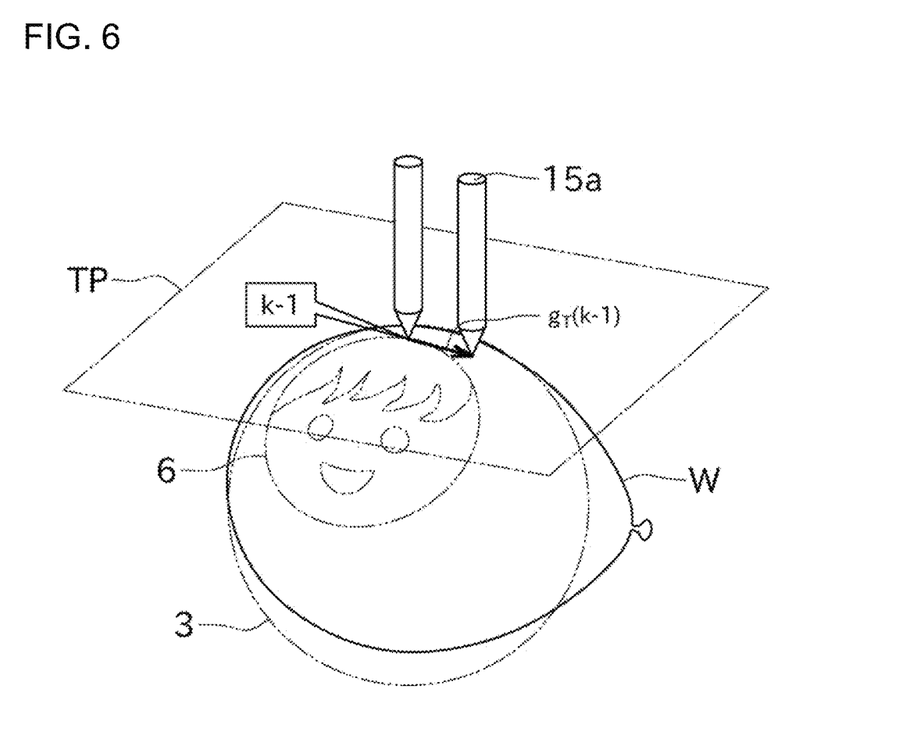
FIG. 6 is a diagonal view illustrating the control of the pen operation.
Figure 7:
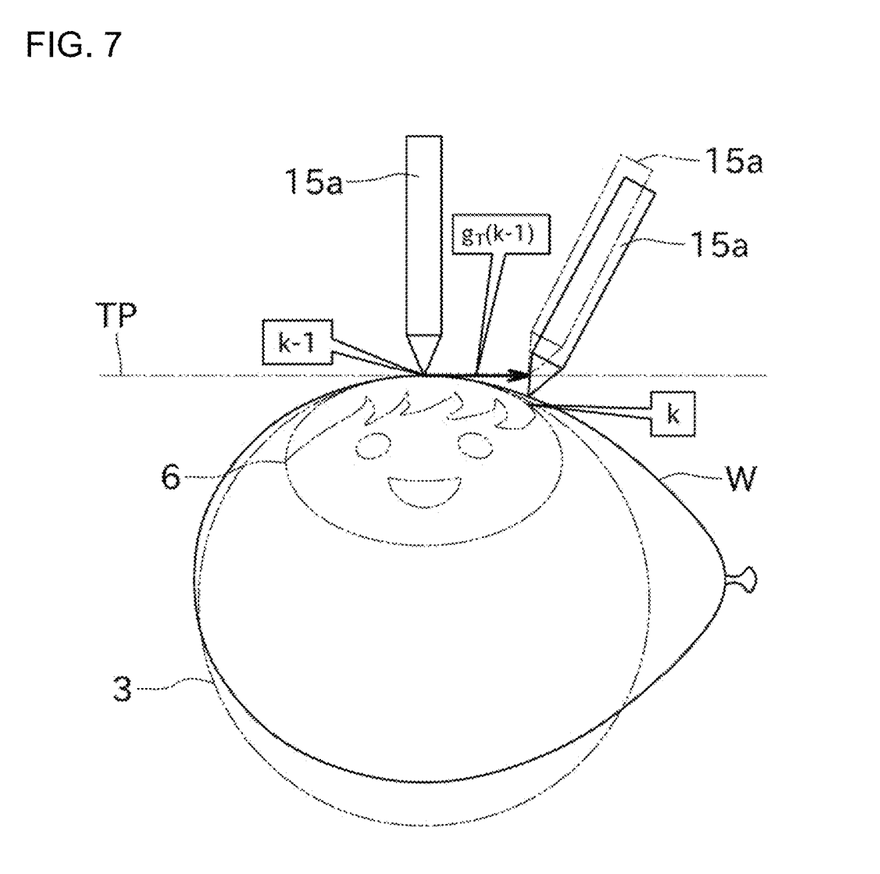
FIG. 7 is a side view illustrating a height adjustment to a tip of the pen.

In the following, the process shown in step S203 will be explained in detail referring to FIGS. 5 to 7, using an example of moving the pen 15a from the virtual contact point (k−1) to the virtual contact point (k), shown in FIG. 5. The virtual contact point (k−1) corresponds to the immediately previous virtual contact point, and the virtual contact point (k) corresponds to the current virtual contact point. For the sake of clarity of explanation, FIG. 5 and the like are drawn with exaggeration so that the adjacent virtual contact point (k−1) and the virtual contact point (k) are far apart.

Figure 5:
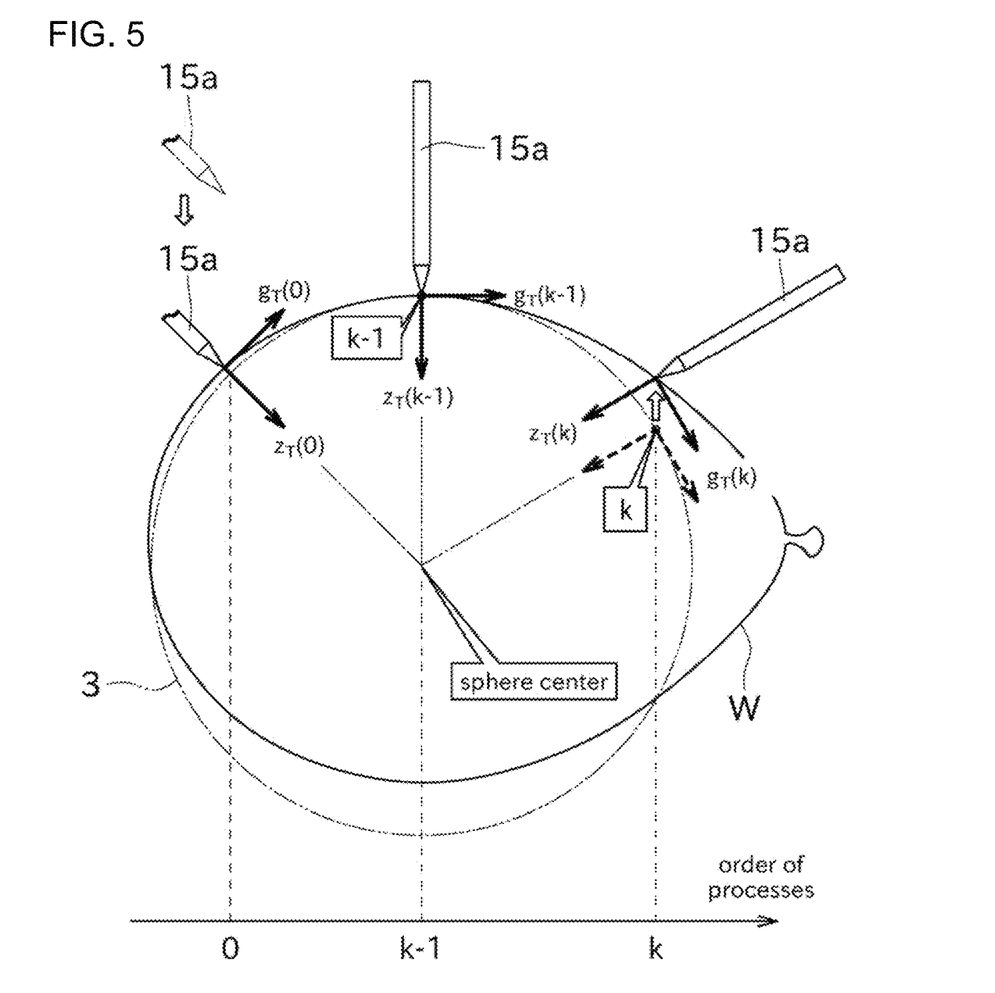
FIG. 5 is a side view illustrating control of pen operation.

FIG. 5 shows the normal vector $z_T(k-1)$ at the immediately previous virtual contact point (k−1) is shown. FIG. 5 also shows the vector $g_T(k-1)$ in the direction from the immediately previous virtual contact point (k−1) to the current virtual contact point (k). In FIG. 5, the direction of the vector $g_T(k-1)$ is not equal to a direction from the immediately previous virtual contact point (k−1) to the current virtual contact point (k), and this is due to the exaggeration of the representation described above.

In the following, temporarily consider a three-dimensional work tool coordinate system. This work tool coordinate system is redefined each time the virtual contact point to be processed changes. In this work tool coordinate system, a plane including the immediately previous virtual contact point (k−1) and being perpendicular to the normal vector $z_T(k-1)$ (tangent plane TP in FIG. 6) is considered as the XY plane. In the work tool coordinate system, the direction along the normal vector is the Z-axis. In this work tool coordinate system, the vector $g_T(k-1)$ at the virtual contact point (k−1) can be expressed, for example, as the following formula (3).

$$g_T = \frac{1}{\sqrt{dx_T^2 + dy_T^2}} \begin{bmatrix} dx_T \\ dy_T \\ 0 \end{bmatrix} \quad (3)$$

Here, $dx_T$ is a movement amount command value in the x-axis of the work tool coordinate system, and $dy_T$ is a movement amount command value in the y-axis of the work tool coordinate system. As can be seen from the fact that the z-coordinate is always zero in formula (3), the calculated vector $g_T(k-1)$ is contained in the tangent plane TP. Therefore, this vector $g_T(k-1)$ can be called the tangent vector.

The controller 10 controls the robot 100 to move the pen 15a from its current real position to a new position according to the tangent vector obtained as described above. The controller 10 also adjusts the posture of the pen 15a while moving the pen 15a or after moving the pen 15a to match the normal vector at the current virtual contact point (in the above example, the virtual contact point (k)) (step S205).

The controller 10 then determines whether it is necessary to adjust the height of the tip of the pen 15a (i.e., the contact degree between the tip of the pen 15a and the balloon W), based on the detection value of the force sensor 14 (step S206).

For example, if the detection value of the force sensor 14 is above the predetermined threshold value (or the maximum value in the predetermined threshold value range), the controller 10 determines that the height of the pen 15a needs to be adjusted and, while maintaining the posture of the pen 15a, moves the tip of the pen 15a upward (i.e., away from the balloon W).

If the detection value of the force sensor 14 is less than the predetermined threshold value (or the minimum value in the predetermined threshold value range), the controller 10 determines that the height of the pen 15a needs to be adjusted and, while maintaining the posture of the pen 15a, moves the tip of the pen 15a downward (i.e., in the direction closer to the balloon W).

In the example in FIG. 5, the pen 15a, which moved according to the vector from the immediately previous virtual contact point (k−1) to the current virtual contact point (k) is denting the real balloon W. Therefore, the pen 15a moves upward to make contact with the balloon W with the appropriate degree of contact. Conversely, it is also possible that the pen 15a, after moving, is away from the real balloon W. In this case, the pen 15a moves downward to make contact with the balloon W with the appropriate degree of contact.

Downward corresponds to the direction in which it advances inward from the sphere 3, and upward corresponds to the direction in which it retreats outward from the sphere 3. In practice, the height of the pen 15a is adjusted every time the pen 15a moves a sufficiently small distance. Therefore, the pen 15a does not break the balloon W and the drawing is not interrupted by the pen 15a leaving the balloon W.

In the determination of step S206, if it is determined that there is no need to adjust the height of the tip of the pen 15a (i.e., the force sensor 14 is within the predetermined threshold value (or within the predetermined threshold value range)), the process returns to step S202 and the controller 10 performs processing for the next virtual contact point.

Steps S205, S206 and S207 described above correspond to the work tool posture control process.

Thus, by using the curved surface following control method for the robot of the present invention, the work tool 15 attached to the end-effector 13 of the robot 100 can be made to perform work while following the curved surface of the target workpiece, without prior measurement of the surface shape of the target workpiece.

As explained above, the curved surface following control method for the robot of this embodiment is used for controlling the robot 100 including the end effector 13 to which the pen 15a is attached, the articulated arm 12 which is connected to the end effector 13, and controller controlling the end effector 13 and the articulated arm 12. In this curved surface following control method for the robot, the processes including the normal direction identification process and the work tool posture control process are performed. In the normal direction identification process, based on the formula for approximating the shape of a balloon W including the curved surface, the normal direction of the sphere 3 which is the shape represented by the formula at the virtual contact point where the pen 15a attached to the end effector 13 contacts the sphere 3 is identified. In the work tool posture control process, the pen 15a attached to the end effector 13 is brought into contact with the balloon W at the actual contact point which is the position corresponding to the virtual contact point on the surface of the balloon W, in a posture along the normal direction identified in the normal direction identification process.

This allows the robot 100 to work while suitably following the curved surface of the target workpiece, such as the balloon W, while simplifying the advance preparation process. Also, even for a soft object, such as a balloon W, the robot can be made to follow its surface well.

The robot 100 which is the subject of the curved surface following control method for the robot includes the force sensor 14. In the curved surface following control method for the robot, the traveling path of the pen 15a along the surface of the sphere 3 represented by the formula is expressed as a group of the pen travel direction vectors that indicate the movement in the tangent plane TP oriented perpendicular to the normal direction. In the work tool posture control process, the pen 15a in the posture along the normal direction is moved along the respective pen travel direction vectors, and the position of the pen 15a is corrected in the direction of advancing inward from the sphere 3 or retreating outward from the sphere 3 according to the detection value of the force sensor 14.

This allows the contact force on the target workpiece, such as a balloon W, to be maintained at a constant value.

In the curved surface following control method for the robot, in the work tool posture control process, when the detection value of the force sensor 14 is more than the predetermined threshold value, the pen 15a is moved to one side of the position correction direction (upper side of the height direction) while maintaining the posture of the pen 15a. When the detection value of the force sensor 14 is less than the predetermined threshold value, the pen 15a is moved to the other side of the position correction direction (lower side in the height direction) while maintaining the posture of the pen 15a. The position correction direction is constant regardless of the normal direction of the sphere 3.

This allows a simple control to maintain the contact force on the target workpiece, such as a balloon W, at a constant value.

While some preferred embodiments of the present invention have been described above, the foregoing configurations may be modified, for example, as follows.

The controller 10 may perform some or all of the processing performed by the pre-processing device 2, such as generating a work trajectory. If the controller 10 performs all of the processing performed by the pre-processing device 2, the pre-processing device 2 may be omitted.

The normal vector and/or tangent vector at each virtual contact point included in the three-dimensional work trajectory 6 may be computed by the pre-processing device 2 in the advance preparation.

Illustrations may be drawn on its side surface or the like of the balloon W, rather than on its top surface. In this case, the direction in which the pen 15a is moved according to the detection value of the force sensor 14 (position correction direction) is different from the vertical direction. In the example above, the position correction direction is constant regardless of the normal direction, but the pen 15a may be moved in the direction of the normal vector described above according to the detection value of the force sensor 14.

The curved surface following control method for the robot can be applied to a ruling work, a polishing work, a coating work on a workpiece with a curved surface, a cream applying work to the surface of a cake (especially, side surface which is curved), an applied-cream shaping work, a plastering work on the curved surface of a wall, and the like.

DESCRIPTION OF THE REFERENCE NUMERALS

10 Controller
12 Articulated arm (arm part)
13 End effector (hand part)
15 Work tool
15a Pen (work tool)
W Balloon (target workpiece)
100 Robot

The invention claimed is:

1. A curved surface following control method for controlling a robot including a hand part to which a work tool is attached, an arm part connected to the hand part, and a controller for controlling operation of the hand part and the arm part, the curved surface following control method comprising:
   a normal direction identification process that includes, based on a formula for approximating a shape of a target workpiece including a curved surface, identifying a normal direction of a virtual shape which is a shape represented by the formula at a virtual position where the work tool attached to the hand part contacts the virtual shape; and
   a work tool posture control process that includes bringing the work tool attached to the hand part into contact with the target workpiece at a corresponding position which is a position corresponding to the virtual position on a surface of the target workpiece, in a posture along the normal direction identified in the normal direction identification process, wherein
   the robot or the work tool includes a force sensor,
   a traveling path of the work tool along a surface of the virtual shape represented by the formula is expressed as a group of work tool travel direction vectors that indicate a movement in a tangent plane oriented perpendicular to the normal direction, and
   in the work tool posture control process, moving the work tool in the posture along the normal direction along respective work tool travel direction vectors, and correcting a position of the work tool in a direction of advancing inward from the virtual shape or retreating outward from the virtual shape according to a detection value of the force sensor.

2. The curved surface following control method of claim 1, wherein
   in the work tool posture control process,
      when the detection value of the force sensor is more than a predetermined threshold value, moving the work tool to one side in a position correction direction while maintaining the posture of the work tool, and
      when the detection value of the force sensor is less than the predetermined threshold value, moving the work tool to the other side in the position correction direction while maintaining the posture of the work tool, and
   the position correction direction is constant regardless of the normal direction of the virtual shape.

3. The curved surface following control method of claim 1, wherein
   in the work tool posture control process,
   when the detection value of the force sensor is more than a predetermined threshold value, moving the work tool to one side in a position correction direction while maintaining the posture of the work tool.

* * * * *